Patented June 15, 1948

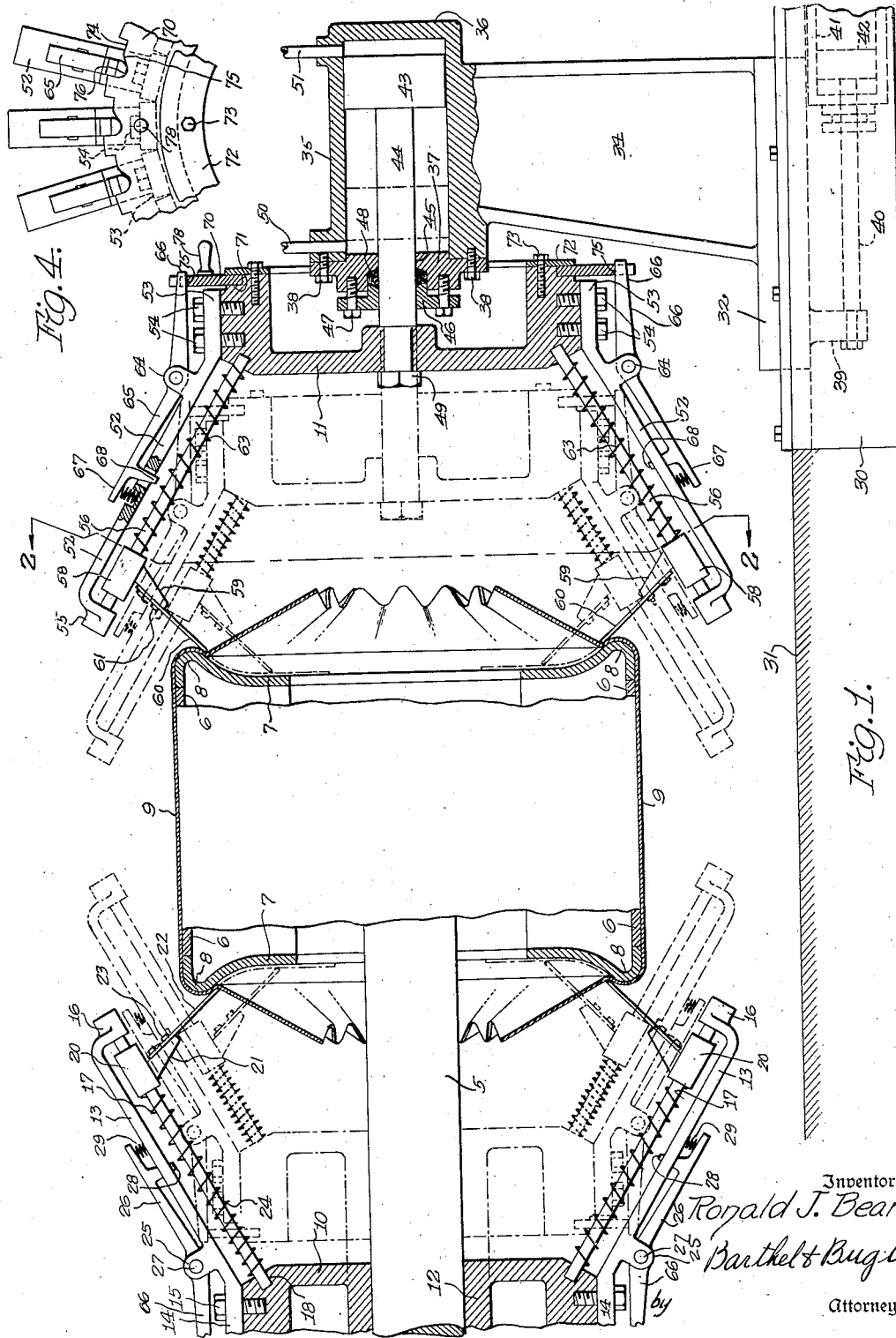

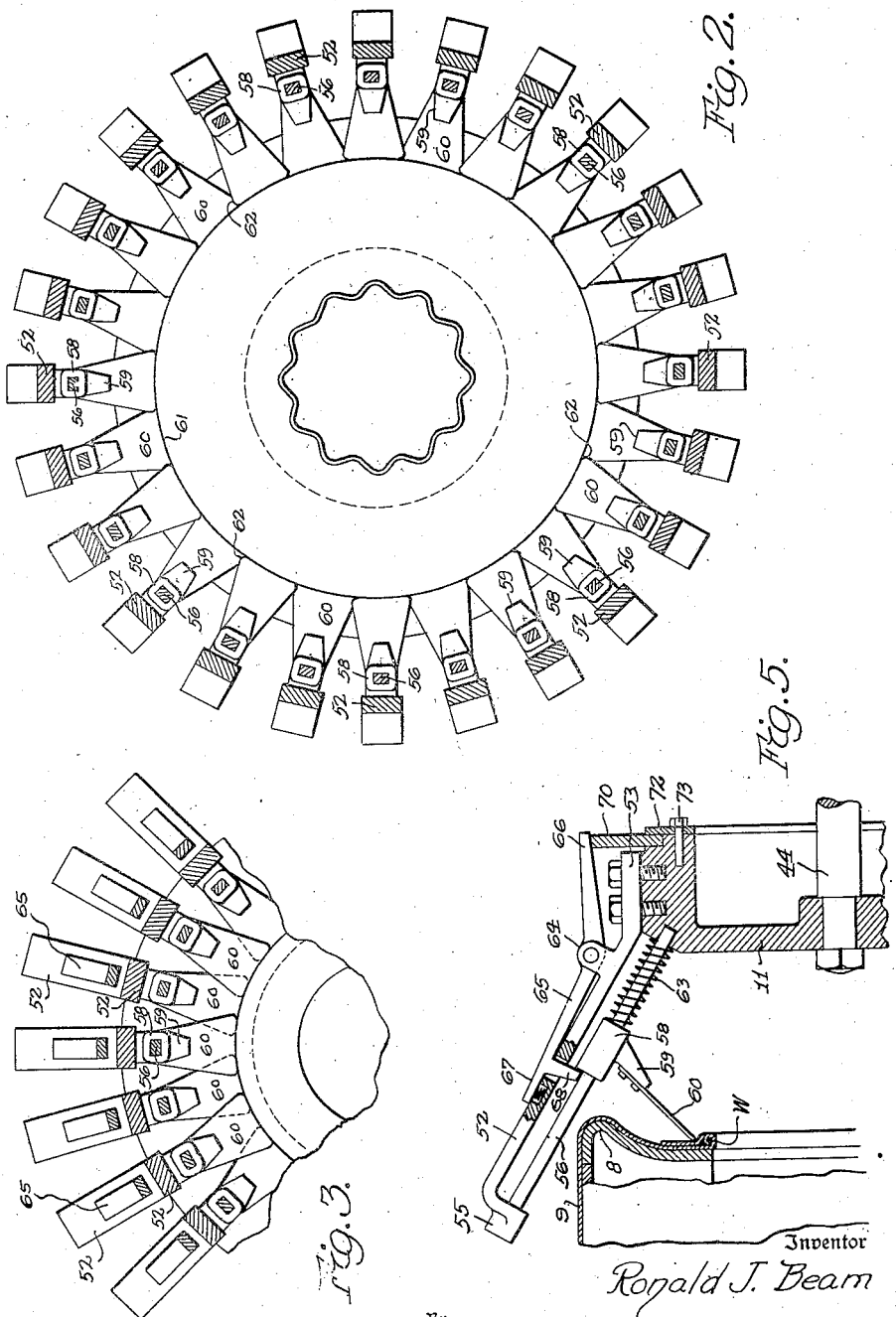

2,443,551

UNITED STATES PATENT OFFICE 2,443,551

TIRE MAKING AND BUILDING APPARATUS

Ronald J. Beam, Detroit, Mich.

Application October 16, 1944, Serial No. 558,911

7 Claims. (Cl. 154—10)

The present invention relates to improvements in the art of making pneumatic tires, and more particularly to an apparatus for constructing and building fabric carcasses therefor.

The primary object of the invention is to provide an apparatus for pressing, forming and shaping the edges of a preformed circular band of fabric or so-called carcass pocket after it is applied to a collapsible forming drum so that the overhanging edges thereof will be compacted in the region of the bead and the successive bands or carcass pockets and plies of fabric will be united to form a uniform wall structure through the entire circumference of said region.

Another object of the invention is to provide an apparatus for shaping and forming the edges of so-called fabric carcass pockets as they are successively applied to a drum so as to insure the edges being folded and compressed into position to form an annular tire carcass blank member built up of a series of superposed carcass pockets which may be readily removed from said drum and shaped to form a complete tire carcass.

Another object of the invention is to provide an apparatus of the above type in which the edge of each fabric carcass band or pocket is simultaneously shaped about the entire peripheral edge of the carcass blank to thereby facilitate the building of fabric carcasses for tires with a great saving in time and labor.

Another object of the invention is to provide an apparatus for shaping, forming and building tire carcasses or tire carcass blanks from which the finished carcass is produced by providing a series of yielding resilient fingers arranged and positioned so as to simultaneously engage the edge of each fabric layer or circular lamination in one direction of movement to press the same into a definite shape in conformity with the end portions of the drum and to smooth the return bent edge of the fabric in another direction of movement to form a beaded area or region on each side of the carcass blank.

Another object of the invention is to provide an apparatus for pressing and smoothing the edges of carcass fabric bands or pockets as they are applied to a forming drum or the like so that the edges will be shaped for receiving a wire bead member of annular configuration as the laminations are progressively built up to form a carcass blank.

Another object of the invention is to provide an apparatus of the above-mentioned character in which a series of resilient spring fingers are mounted on a carrier and arranged so as to travel inwardly and outwardly a slight distance when the fingers are simultaneously moved toward and away from the forming drum to thereby cause said fingers to smooth the edge of the fabric layers and compress said fabric into a compact mass.

Another object of the invention is to provide an apparatus of the type above set forth in which the forming fingers may be locked or retained in their contracted positions (which is the position they assume at the end of their initial pressing and forming movement) by a locking member so that the fingers may be moved away from the fabric edge in their locked position to facilitate the fabric edge being bent over the conventional wire bead member, whereby the forming fingers may be brought into their operative position so that release of the locking member will permit said fingers to expand and smooth the return bent portion of the fabric into contactual engagement with the previously shaped or preformed fabric edge portion.

Other objects and advantages will become apparent during the course of the following description of the accompanying drawings, wherein:

Figure 1 is a longitudinal cross sectional view of the pressing, shaping and forming apparatus embodying the present invention;

Figure 2 is a transverse cross sectional view taken on the zigzag line 2—2 of Figure 1 looking in the direction of the arrows to illustrate the arrangement of pressing and shaping fingers and the manner in which the free edges thereof are overlapped;

Figure 3 is a view similar to Figure 2 but showing the pressing and forming fingers contracted with the inner edges thereof overlapped with adjacent fingers;

Figure 4 is a fragmentary end elevational view of the pressing, forming and shaping finger carrier illustrating the locking members for retaining the pressing, shaping and forming fingers in their contracted position and showing the manner in which said locking members are simultaneously controlled by a common operator therefor; and Figure 5 is a fragmentary cross sectional view illustrating the position that the pressing, shaping and forming fingers assume when locked in their contracted position so that when released, the ends of the fingers will smooth and press the return bent edge of the fabric in contactual engagement with the preformed portion thereof when the resilient pressing and forming finger carrier is moved away from the forming drum.

Brief description of the invention

In the formation and building of heavy duty pneumatic tires, the carcass blank is built up of a series of continuous bands which are known as carcass pockets and are cut on the bias so as to be placed on a forming drum in such a manner as to permit the edges of the fabric to extend over the edges of the drum, whereby the operator can manually press said edges to conform to the rounded edge of the drum and after a series of bands or pockets have thus been built up, the laminated carcass is completed. The carcass is then placed upon a former which expands and causes the carcass to stretch to a position resembling the cross sectional shape of a vehicle tire casing. The several layers or laminations are caused to adhere one to the other by reason of a very thin film or layer of latex rubber on both sides thereof to partially unite the layers and facilitate the forming of the edges over the forming drum.

In the present invention, a collapsible forming drum of conventional structure is adapted to receive the series of fabric carcass bands or pockets which are cut on the bias so that the edges will project over the edge of said collapsible drum for being shaped or preformed in the area of the tire bead region. Instead of manually forming the edges over the peripheral edge of the drum, a plurality of movable spring fingers are supported by carriers disposed on opposite sides of the drum so that inward movement of said carriers will cause said fingers to wipe and smooth the free edges of the fabric and compact the edge portions or areas into a uniform mass so that said edges may be later return bent or folded upon themselves for receiving the bead wire or reenforcing member. After the yielding forming and pressing fingers and carriers have been moved to the limit of their inward travel toward the drum and its center, the spring fingers are locked in their contracted position so that they may be moved away from the forming drum until after the free edge of the fabric has been bent or folded on itself and the reenforcing wire positioned in said fold. The forming fingers are then brought back into their previous position so as to engage the return bent portion of the fabric, whereupon expansion of said fingers as by moving the same away from the drum, will cause the fabric to be smoothed and pressed into contactual engagement with the previously pressed or preformed portion. This operation is repeated after each fabric band or lamination has been applied to the drum and after a predetermined number of bands or laminations have been wound and formed as above described, the drum is collapsed and the carcass blank removed therefrom for being shaped by expansion in a suitable forming apparatus to cause said carcass blank to assume the cross-sectional shape of a tire casing. After the carcass has thus been formed, the rubber tread and side walls are applied in the usual manner with the aid of suitable molds or the like.

Detailed description of the invention

In the drawings, the reference character 5 will generally be employed to designate a shaft which has one end affixed to a suitable support (not shown) and its opposite end provided with a collapsible forming drum 6 having a relatively flat peripheral portion and short radial wall portions 7 connected by pre-shaped curved portions 8. The shaft 5 may be supported in such a manner as to be rotated so as to permit rotation of the drum 6 when applying the fabric carcass bands 9 thereto, which as mentioned before are of circular form and cut on the bias so as to facilitate the shaping thereof into a completed tire carcass. As illustrated in Figure 1, the first fabric pocket or carcass band 9 is applied to the drum 6 so that a portion of both edges overhangs the preformed edges 8 of the drum, whereby said free edges may be shaped and compacted to form the beaded zone of the completed pneumatic tire carcass. The next band is applied by spinning the drum and slipping the band laterally thereover. The centrifugal force causes the second band to force itself from the initially applied band.

The invention comprises a pair of carriers 10 and 11 disposed one on each side of the drum 6 with the axis thereof in alignment with the axis of the drum 6. The carrier 10 is provided with a hub portion 12 slidably mounted upon the supporting shaft 5 and the peripheral portion of the carrier 10 is provided with a series of carrier brackets 13 which extend obliquely with respect to the axis of the shaft 5 and drum 6. The inner ends of the carrier brackets 13 are provided with foot portions 14 which are held in place by suitable bolts or the like as at 15 and the free ends of said carrier brackets 13 are shaped to provide bracket supports 16 for the outer ends of slide rods 17. The inner ends of the slide rods 17 are received in openings 18 in the disc-like carrier 10 and said rods extend in parallelism with the carrier brackets 13.

Slidably mounted on each of the slide rods 17 is a slide block 20 which is provided with an inwardly projecting bracket portion 21 to which is attached a yielding, pressing, shaping and forming finger 22 constructed of resilient metal or other suitable material. The outer ends of each pressing, forming and shaping finger 22 are bolted or affixed to the inwardly projecting bracket arms 21 by machine screws or the like as at 23 so that the spring fingers will travel with the slide block 20 as indicated by the dotted lines in Figure 1. A coil spring 24 encircles each slide rod 17 and has one end thereof abutting the circular carrier head 10 and the opposite end in abutting relation with the slide block 20 so as to maintain said slide block in the full line position shown in Figure 1.

Formed on each carrier bracket 13 is a pair of upstanding lugs 25 for supporting latch members which are adapted to engage the sliding block 20 and retain the resilient forming, pressing and shaping fingers in their contracted positions. The latch member for each carrier bracket carries a bar 26 pivoted to the upstanding lugs 25 as at 27 so that the outer end of each latch bar 26 will be disposed adjacent the carrier head so as to be simultaneously controlled by a common operator. The inner ends of the latch bars 26 are provided with detent projections 28 which are adapted to engage the slide blocks 20 and retain the yielding, pressing, forming and shaping fingers in their contracted position. A coil spring 29 is interposed between each of the carrier brackets and latch levers 26 so as to normally hold the detent projection 28 out of engagement with the sliding block 20. The carrier head 10 may be operated by fluid pressure in a manner which will be more fully described hereinafter.

The carrier head 11 is mounted slightly differently than the carrier head 10 and, as indicated in Figure 1, the slide support 30 is imbedded in the floor 31 of the plant so that a slide 32 may be movably mounted thereon. Formed integral with and extending upwardly from the slide 32 is a support 34 which carries a cylinder 35 at the upper end thereof, having a closure wall 36 at one end and a closure plate 37 at the opposite end held in place by machine screws or the like as at 38. The under side of the slide 32 is provided with a projection 39 to which is connected one end of a reciprocating plunger rod 40 which is controlled by admitting fluid under pressure to a cylinder 41 on opposite sides of the piston 42 to which the plunger rod 40 is attached. Suitable mechanism may be provided for admitting fluid under pressure to the ends of the cylinder 41 on opposite sides of the cylinder 42.

Reciprocably mounted within the cylinder 35 is a piston 43 to which is attached or affixed a plunger rod 44 which extends through an opening 45 in the closure plate 37 and is sealed by a packing gland 46 held in place by screws as at 47. Tightening of the screws 47 will extend the packing member 48 into sealing engagement with the reciprocating plunger rod 44. As indicated in Figure 1, the carrier head 11 is retained on the reciprocating plunger rod 44 by means of a nut or the like as at 49 so that when fluid under pressure is admitted to the ends of the cylinder 35 through the pipes 50 and 51, on opposite sides of the piston 43, said carrier head will move to and fro from its full line position to its dotted line position and return.

The forming and pressing finger structure is similar to the forming and pressing finger structure on the carrier head 10 and likewise includes a series of carrier brackets 52 having angularly disposed inner ends or foot portions 53 for being secured to the peripheral portion of the carrier head 11 by machine screws or the like as at 54. The free ends of the carrier brackets are shaped to provide supporting brackets or members 55 for a series of obliquely disposed slide rods 56 so as to retain the other ends of the slide rods within recesses or openings 57 arranged in spaced circumferential relation around the peripheral edge of the carrier head 11. Slidably mounted on each of the slide rods 56 is a slide block 58 and each slide block is provided with an inwardly extending bracket portion 59 to which is attached a resilient, yielding, pressing, shaping and forming finger 60. Bolts or the like as at 61 are provided for retaining the inner reduced end portions of the yielding, pressing, shaping and forming fingers in position so that the free ends thereof will overlap with adjacent fingers. It is to be noted in Figure 2 that the inner ends of the pressing, shaping and forming fingers 22 and 60 are outwardly flared and that the extreme free edges thereof are arcuately curved as at 61 to conform to the circular shape desired. The corner portion 62 of the resilient, pressing, shaping and forming fingers are rounded so as to prevent the same from mutilating or projecting into the fabric 9 during the forming operation. While the resilient, yielding, pressing, shaping and forming fingers have been shown in alternate overlapping relation, it is to be understood that they may be arranged so as to overlap in the same direction with the adjacent edges of the fingers overlapping an adjacent finger. Coil springs 63 are provided for each of the slide rods 56 with one end in abutting relation with the carrier head 11 and their opposite ends in abutting relation with the slide block 58 so as to retain said resilient, pressing, shaping and forming fingers 60 in their expanded position. Each of the carrier brackets 52 is provided with a pair of upstanding lugs 64 between which is pivoted a latch lever 65 which is arranged so that one end thereof will project rearwardly as at 66 and the opposite end as at 67 will extend parallel with the carrier brackets 52. A latch detent 68 is formed on the end of each of the latch members 65 and is adapted to project through an opening 69 in the carrier bracket 52 so as to be disposed within the path of the slide block 58. The ends 66 of the latch levers 65 are disposed so as to be engaged by a control cam ring 70 which is rotatably mounted on the carrier head 11 within an annular recess 71 therein. A retaining ring 72 is held in place by a series of machine screws 73 for engaging said cam ring and preventing displacement thereof. The peripheral surface of the cam ring 70 is provided with a series of notches having cam surfaces 75 for engaging the rounded portions 76 of the latch lever 65 whereby rotation of the cam ring 70 by means of a control member 78 will cause said latch lever to be simultaneously projected into the path of the slide block 58.

The carrier head 10 may be operated by a fluid pressure device in a manner similar to the carrier head 11, and the pivoted latch bars 26 may likewise be operated by a common cam ring such as the cam ring 70 above described, so as to cause said latch bars 26 to operate in unison and simultaneously lock the slide blocks 20 in their dotted line positions (Figure 1).

*Operation of the invention*

In the forming of heavy duty tire carcass blanks in accordance with the present invention, the collapsible drum 6 may have applied thereto a fabric band of a suitable circular size commonly known as a tire carcass pocket 9 which is cut on the bias and is of a sufficient width to overlie the edges of said drum as shown in Figure 1. After the fabric band is applied to the drum 6, the shaft 5 is held stationary and the carrier heads 10 and 11 are moved inwardly toward one another so that the pressing and forming fingers 22 and 60 will engage the overlying edges of the fabric band or carcass pocket 9 and press, shape and form the same over the curved edge portions 8 of said drum. As the carrier heads 10 and 11 move toward one another, the slide blocks 20 and 58 move at an angle to and toward the axis of the drum so that the resilient spring pressing and forming fingers 22 and 60 will likewise move inwardly and cause the overlying edges of the fabric to be compacted and compressed into a uniform mass. By reason of the fact that the fabric 9 is coated or impregnated with a rubber latex compound, the overlying edges of the fabric are caused to fold and unite so as to conform with the shape of the drum 6.

When the forming heads 10 and 11 have moved to the limit of their inward travel, the resilient pressing, and forming fingers will assume a contracted position as shown in dotted lines in Figure 1, and the overhanging edges of the fabric will be pressed and the folds will be caused to adhere to form a compact mass. After the edges of the fabric have thus been shaped, pressed and formed, the latch bars 26 and 55 are operated by manipulating the cam rings therefor as at 70, so as to cause the latch detents 28 and 68 to be extended through their respective openings in the carrier brackets 13 and 52 respectively, so as to project into locking engagement with the slide blocks 20 and 58 (Figure 5). In this position the slide blocks 20 and 58 are under the tension of the coil springs 24 and 63 and are locked against expansion as shown in dotted lines in Figure 1. The carrier heads 10 and 11 may now be separated by manipulating the slide supports therefor so that the operator can position the usual circular preformed wire bead members against the formed portions of the overlapping edges of the fabric 9 as indicated in Figure 5, whereupon the operator may fold the extreme free edge of the fabric back upon itself to form an envelope and enclose the wire bead or reenforcing element W. When the operator has placed the wire bead member W in position and folded the free edge of the fabric thereover, as shown in Figure 5, the carrier heads 10 and 11 may again be brought into operation with the resilient, yielding, pressing, shaping and forming fingers 22 and 60 in their contracted positions so that the free edges of the fingers will engage the return bent edge of the fabric as indicated in Figure 5. By releasing the latch levers 26 and 55, the spring fingers 22 and 60 will move in a radial direction when the pressure in the cylinder 35 is reduced so as to permit said carrier heads 10 and 11 to move away from one another. As the carrier heads separate, the yielding, pressing, shaping and forming fingers slide over the edge of the fabric and smooth the same while at the same time pressing said edge into contactual engagement with the previously shaped and formed portion of said fabric.

When the heads are separated, another fabric band of slightly greater width may be applied to the drum 6 over the initial fabric band by spinning the drum to prevent sticking between the initial band and the newly applied one. The process is repeated until the required number of fabric bands or carcass pockets have been built up to form a carcass blank of the desired thickness. The drum 6 may then be collapsed and the carcass blank removed for being expanded into shape by suitable fluid pressure apparatus of the usual construction and forming no part of the present invention.

It might be added that after the yielding, pressing and shaping fingers 22 and 60 have been contracted to perform the initial operation of folding, compacting and pressing the edge of the fabric into place about the curved portion of the drum 8, the fingers may be held in their contracted position by the latch levers 26 and 55 and then the slide 32 operated to move the heads apart. It will thus be seen that movement of the slide 32 after the initial operation, positions the piston 43 in the left-hand end of the cylinder 35 so that when the carrier head 11 is returned for the outfolding operation, the pressure may be relieved from the right-hand end of the cylinder 35 to thereby cause the retraction of the carrier head 11 and the resultant movement of the yielding, pressing, shaping and forming fingers in a radial direction. A slide carrier as described in connection with the carrier head 11 may be provided for the carrier head 10 to facilitate the operation thereof in a similar manner, it being understood that the carrier heads operate in unison during the pressing, shaping and forming operation as well as the folding back operation above described.

It is to be understood that the form of the invention herewith shown and described is to be taken as a preferred embodiment of the same and that various changes may be made in the shape, size and arrangement of parts without departing from the spirit of the invention or the scope of the subjoined claims.

What I claim is:

1. An apparatus for building carcasses for pneumatic tires, comprising a collapsible forming drum having a relatively flat peripheral surface terminating at the sides in curved edge portions for receiving a fabric blank of circular shape, a carrier head mounted on each side of the forming drum movable toward and away therefrom, a series of slide rods mounted on each carrier head extending radially and obliquely to the axis of said drum, slides mounted on said slide rods for longitudinal movement thereon, a yielding, pressing and shaping finger secured to each slide with its free end arranged in overlapping relation with adjacent pressing and shaping fingers, means for moving said carrier heads toward said drum to cause said fingers to engage and smooth the overhanging edges of said fabric blank, and means for yieldingly urging said slides and yielding fingers to the limit of their radial travel.

2. An apparatus for building carcasses for pneumatic tires, comprising a collapsible forming drum having a relatively flat peripheral surface terminating at the sides in curved edge portions for receiving a fabric blank of circular shape, a carrier head mounted on each side of the forming drum movable toward and away therefrom, a series of slide rods mounted on each carrier head extending radially and obliquely to the axis of said drum, slides mounted on said slide rods for longitudinal movement thereon, a yielding, pressing and shaping finger secured to each slide with its free end arranged in overlapping relation with adjacent pressing and shaping fingers, means for moving said carrier heads toward said drum to cause said fingers to engage and smooth the overhanging edges of said fabric blank, means for yieldingly urging said slides and yielding fingers to the limit of their radial travel, and means for locking said slides and yielding, pressing and shaping fingers in a contracted position.

3. An apparatus for building carcasses for pneumatic tires, comprising a collapsible forming drum having a relatively flat peripheral surface terminating at the sides in curved edge portions for receiving a fabric blank of circular shape, a carrier head mounted on each side of the forming drum movable toward and away therefrom, a series of slide rods mounted on each carrier head extending radially and obliquely to the axis of said drum, slides mounted on said slide rods for longitudinal movement thereon, a yielding, pressing and shaping finger secured to each slide with its free end arranged in overlapping relation with adjacent pressing and shaping fingers, means for moving said carrier heads toward said drum to cause said fingers to engage and smooth the overhanging edges of said fabric blank, means for yieldingly urging said slides and yielding fingers to the limit of their radial travel, means for locking said slides and yielding, pressing and shaping fingers in a contracted position against the action of said yielding means, and means carried by said carrier head for releasing said locking means and causing said yielding, pressing and shaping fingers to be moved to a projected position by said yielding means.

4. An apparatus for building carcasses for pneumatic tires, comprising a collapsible forming drum having a relatively flat peripheral surface terminating at the sides in curved edge portions for receiving a fabric blank of circular shape, a carrier head mounted on each side of the forming drum movable toward and away therefrom, a series of slide rods mounted on each carrier head extending radially and obliquely to the axis of said drum, slides mounted on said slide rods for longitudinal movement thereon, a yielding, pressing and shaping finger secured to each slide with its free end arranged in overlapping relation with adjacent pressing and shaping fingers, means for moving said carrier heads toward said drum to cause said fingers to engage and smooth the overhanging edges of said fabric blank, and means for yieldingly urging said slides and yielding fingers to the limit of their radial travel, said yielding, pressing and shaping fingers being formed of a resilient metal.

5. An apparatus for building carcasses for pneumatic tires, comprising a collapsible forming drum having a relatively flat peripheral surface terminating at the sides in curved edge portions for receiving a fabric blank of circular shape, a carrier head mounted on each side of the forming drum movable toward and away therefrom, a series of slide rods mounted on each carrier head extending radially and obliquely to the axis of said drum, slides mounted on said slide rods for longitudinal movement thereon, a yielding, pressing and shaping finger secured to each slide with its free end arranged in overlapping relation with adjacent pressing and shaping fingers, means for moving said carrier heads toward said drum to cause said fingers to engage and smooth the overhanging edges of said fabric blank, and means for yieldingly urging said slides and yielding fingers to the limit of their radial travel, said last-named means including coil springs encircling the slide rods with one end of each coil spring arranged in abutting relation with a corresponding slide block and their opposite ends in engagement with said carrier heads.

6. An apparatus for building pneumatic tire carcasses, comprising a forming drum having arcuately shaped peripheral edge portions, said drum being adapted for receiving a fabric carcass band of circular shape of sufficient width to overhang the edge portions of said forming drum, a series of yielding, pressing and forming fingers mounted on each side of the drum movable toward and away from the peripheral edge portion thereof to engage the overhanging edges of said carcass band and compress the same into conformity with the contour of the peripheral edge portions of said drum, means for moving said fingers radially and longitudinally, and means for locking said yielding, pressing and forming fingers in their contracted position so that they may be moved away from said drum to facilitate said overhanging edges being return bent, whereby they will be pressed and shaped upon the return movement of said yielding fingers into engagement with said return bent edges and upon radial outward movement of said fingers.

7. An apparatus for building pneumatic tire carcasses, comprising a forming drum having arcuately shaped peripheral edge portions, said drum being adapted for receiving a fabric carcass band of circular shape of sufficient width to overhang the edge portions of said forming drum, a series of yielding, pressing and forming fingers mounted on each side of the drum movable in an axial direction toward and away from the peripheral edge portion thereof to engage the overhanging edges of said carcass band and compress the same into conformity with the contour of the peripheral edge portions of said drum, means for moving said fingers radially and longitudinally, means for locking said yielding, pressing and forming fingers in their contracted position so that they may be moved away from said drum to facilitate said overhanging edges being return bent, whereby they will be pressed and shaped upon the return movement of said yielding fingers into engagement with said return bent edges and upon radial outward movement of said fingers, and means for controlling said locking means.

RONALD J. BEAM.

REFERENCES CITED

The following references are of record in the file of this patent:

UNITED STATES PATENTS

| Number | Name | Date |
|---|---|---|
| 1,441,767 | Williams | Jan. 9, 1923 |
| 1,526,594 | Gammeter | Feb. 17, 1925 |
| 1,562,754 | Gautier | Nov. 24, 1925 |
| 2,065,971 | Herbert et al. | Dec. 29, 1936 |
| 2,313,035 | Breth | Mar. 9, 1943 |

FOREIGN PATENTS

| Number | Country | Date |
|---|---|---|
| 522,424 | Great Britain | June 18, 1940 |